(12) United States Patent
Kato

(10) Patent No.: US 12,409,524 B2
(45) Date of Patent: Sep. 9, 2025

(54) BARREL CAM DEVICE

(71) Applicant: TECHNO DYNAMICS, INC., Shizuoka (JP)

(72) Inventor: Heizaburo Kato, Shizuoka (JP)

(73) Assignee: TECHNO DYNAMICS, INC., Shizouka (JP)

( * ) Notice: Subject to any disclaimer, the term of this patent is extended or adjusted under 35 U.S.C. 154(b) by 0 days.

(21) Appl. No.: 18/577,100

(22) PCT Filed: Mar. 29, 2022

(86) PCT No.: PCT/JP2022/015427
§ 371 (c)(1),
(2) Date: Jan. 5, 2024

(87) PCT Pub. No.: WO2023/002717
PCT Pub. Date: Jan. 26, 2023

(65) Prior Publication Data
US 2024/0316715 A1    Sep. 26, 2024

(30) Foreign Application Priority Data
Jul. 19, 2021    (JP) .................................. 2021-118967

(51) Int. Cl.
*B23Q 16/00* (2006.01)
*B23Q 1/26* (2006.01)
*B23Q 16/10* (2006.01)

(52) U.S. Cl.
CPC ............. *B23Q 16/001* (2013.01); *B23Q 1/26* (2013.01); *B23Q 16/10* (2013.01)

(58) Field of Classification Search
CPC ........ B23Q 16/001; B23Q 1/26; B23Q 16/10; B23Q 16/105
See application file for complete search history.

(56) References Cited

U.S. PATENT DOCUMENTS

| | | |
|---|---|---|
| 4,512,214 A | 4/1985 | Surman |
| 5,481,944 A | 1/1996 | Oketani et al. |
| 6,279,219 B1 * | 8/2001 | Ohsawa .................... B23Q 7/02 29/434 |
| 6,948,402 B1 | 9/2005 | Amendolea |
| 8,544,363 B2 * | 10/2013 | Tatsuda ................ B23Q 16/105 74/813 L |
| 9,166,457 B2 * | 10/2015 | Yamagishi ........... H02K 11/225 |

(Continued)

FOREIGN PATENT DOCUMENTS

| | | | |
|---|---|---|---|
| DE | 29812055 U1 * | 11/1999 | ............. B23Q 16/02 |
| JP | U1981089407 | 7/1981 | |
| JP | U1991126545 | 11/1992 | |

(Continued)

OTHER PUBLICATIONS

Japanese Office Action for JP2021-118967 dated Oct. 31, 2024.
Japanese International Search Report dated May 19, 2022.
Japanese International Search Report dated Jun. 7, 2022.

*Primary Examiner* — Thomas C Diaz
(74) *Attorney, Agent, or Firm* — Dickinson Wright PLLC

(57) ABSTRACT

A barrel cam device includes a barrel cam, an output table that includes a plurality of cam followers that engage with the barrel cam, and that rotates by rotation of the barrel cam, and a clamp device that clamps the output table when the output table is stopping.

7 Claims, 3 Drawing Sheets

(56) References Cited

U.S. PATENT DOCUMENTS

2012/0180584 A1* 7/2012 Weiss .................. B23Q 16/025
                                                    74/25
2017/0326702 A1* 11/2017 Osaki .................. B23Q 16/105

FOREIGN PATENT DOCUMENTS

| JP | 2001-277074 A | 10/2001 |
| JP | 2001-287138 A | 10/2001 |
| JP | 2004-74328 A | 3/2004 |
| JP | 2005-138216 A | 6/2005 |
| JP | 2009-90422 A | 4/2009 |
| JP | 2010-25245 A | 2/2010 |
| JP | 2010131740 A | 6/2010 |
| JP | 2018155276 A | 10/2018 |
| JP | 2019147212 A | 9/2019 |

* cited by examiner

BARREL CAM DEVICE

RELATED APPLICATIONS

The present disclosure is a national phase application of PCT Application PCT/JP2022/015427, filed Mar. 29, 2022, which claims priority to Japanese Patent Application No. 2021-118967, filed Jul. 19, 2021, the entire contents both of which is incorporated herein by reference.

FIELD

The present disclosure relates to a barrel cam device.

BACKGROUND

The indexing device which uses a cam mechanism is known as an indexing device for workpieces processed by machine tools, etc. (One example of such an indexing device is shown in Japanese Patent Application Publication No. 2001-287138.

In the case of providing at a low cost a clamp device which clamp an output table to an indexing device, we have found there has been a problem that the indexing device have to be made large so that the clamp device can fit in. Alternatively, in the case of configuring the clamp device with small parts so that the clamp device can fit in, there has been a problem of increasing cost.

SUMMARY

The present disclosure was achieved in light of the above-described problem, an aspect of the present disclosure is to realize an indexing device including a clamp device which is compact and inexpensive.

A main aspect of the present disclosure of achieving the above-described aspect is a barrel cam device including: a barrel cam; an output table that includes a plurality of cam followers that engage with the barrel cam, and that rotates by rotation of the barrel cam; and a clamp device that clamps the output table when the output table is stopping.

Features of the present disclosure other than the above will become clear by reading the description of the present specification with reference to the accompanying drawings.

According to the present disclosure, it is possible to realize an indexing device including a clamp device which is compact and inexpensive.

DESCRIPTION

Figure 1:
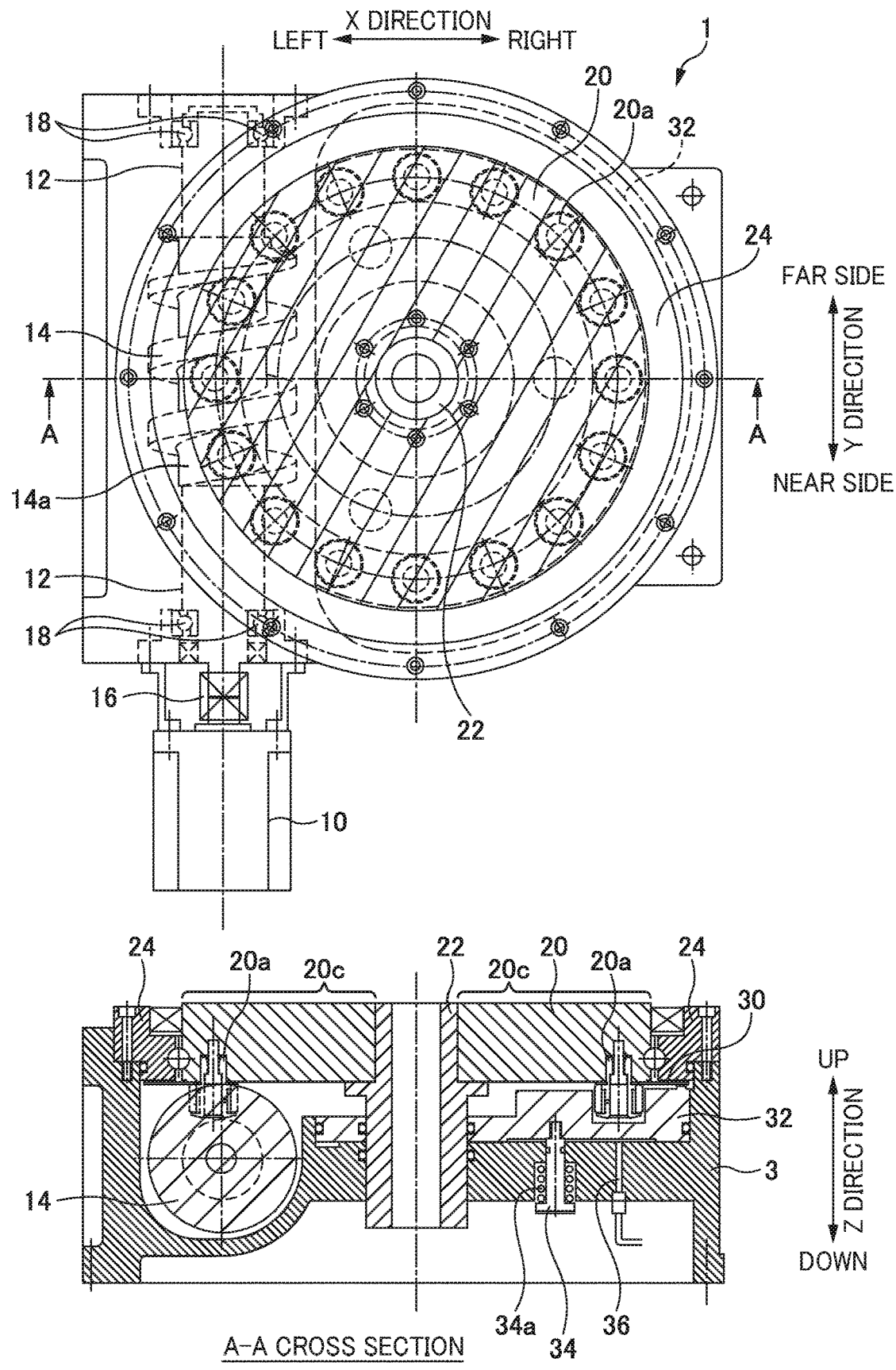
FIG. 1 is a schematic plan view and a schematic side view of an indexing device 1.

At least the following matters will be clear with the description of this specification and the attached drawings.

A barrel cam device including: a barrel cam; an output table that includes a plurality of cam followers that engage with the barrel cam, and that rotates by rotation of the barrel cam; and a clamp device that clamps the output table when the output table is stopping.

According to such a barrel cam device, it is possible to realize the indexing device that includes a compact and inexpensive clamp device.

In such a barrel cam device, it is desirable that the barrel cam device further comprises a supporting portion that rotatably supports the output table, and that the clamp device includes: a plate member that includes a fixed portion that is fixed to the output table, and a opposing portion that faces the supporting portion with being in a non-contact state, when the output table is rotating; and a pressing member that presses the plate member against the supporting portion when the output table is stopping.

According to such a barrel cam device, the clamp device has a simple structure consisting of the plate member and the pressing member, making it possible to realize an inexpensive clamp device.

In such a barrel cam device, it is desirable that the barrel cam device further comprises a housing that accommodates the output table, and that the plate member and the pressing member are provided within the housing.

According to such a barrel cam device, it is possible to effectively utilize a relatively large space in the housing the barrel cam device.

In such a barrel cam device, it is desirable that the fixed portion is fixed to a table lower surface of the output table, that, when the output table is rotating, the opposing portion faces a supporting-portion lower surface of the supporting portion with being in the non-contact state, and that the pressing member presses the opposing portion against the supporting-portion lower surface when the output table is stopping.

According to the barrel cam device, it becomes possible to easily realize to clamp the output table.

In such a barrel cam device, it is desirable that the fixed portion has a through hole, and that the fixed portion and the cam follower are fixed to the table lower surface by a common bolt in a state where the cam follower passes through the through hole.

According to the barrel cam device, by fixing the plate member and the cam follower using a common bolt, it makes bolts for fixing the plate member unnecessary. This makes is possible to reduce costs by reducing the number of parts.

In such a barrel cam device, it is desirable that the pressing member is a piston member that deforms the opposing portion and presses the opposing portion against the supporting portion by moving and being in contact with the opposing portion when the output table is stopping.

According to the barrel cam device, the output table is clamped not only by the frictional force that occurs between the plate member and the supporting portion, but also by the frictional force that occurs between the plate member and the piston member, and this increases the clamping force.

In such a barrel cam device, it is desirable that the barrel cam device further comprises a rotating shaft body that is mounted to a central portion of the output table and that rotates integrally with the output table, and that the piston member is provided throughout from a side where the barrel cam is located when viewed from the rotating shaft body to a side where the barrel cam is not located when viewed from the rotating shaft body.

According to the barrel cam device, the area of the piston member can be increased compared to the case where the piston member is not provided throughout from the side where the barrel cam is located to the side where the barrel cam is not located. Accordingly, the pressure of the compressed gas, etc. becomes greater and presses the plate member, making it possible to clamp the output table with a greater force.

In such a barrel cam device, it is desirable that the piston member has a groove that accommodates the cam follower with being in the non-contact state.

According to the barrel cam device, while increasing the rigidity of the piston member, it possible to prevent the piston member from interfering with the rotation of the output table.

In such a barrel cam device, it is desirable that the barrel cam device further comprises a housing that accommodates the output table, that a part of the housing serves as a cylinder member that accommodates the piston member, that the housing is provided with a compressed-air introducing hole that introduces a compressed air into the cylinder member, and that an area of a pressed surface of the piston member that is pressed by the compressed air is more than half of an area of a table surface of the output table.

According to the barrel cam device, by increasing the area of the piston member to more than half of the area of the output table, compared to the case where the area of the piston member is less than half of the area of the output table, the pressure of compressed gas, etc. become greater and presses the plate member. This makes it possible to clamp the output table with a great force.

Indexing Device 1

The following describes an indexing device 1 (corresponding to the barrel cam device) according to the present embodiment with reference to the drawings. Note that the indexing device 1 can be used for, for example, NC tables for machine tools, positioners for robots, pivots of robots, and the like.

FIG. 1 is a schematic plan view and a schematic side view of the indexing device 1; the upper diagram is the schematic plan view and the bottom diagram is the schematic side view. Note that, in the drawings according to the present embodiment, members may be omitted as appropriate in order to explain the present disclosure in an easy-to-understand manner.

Further, the indexing device 1 according to the present embodiment has the X direction, the Y direction, and the Z direction. The X direction and the Y direction intersect with each other, and the X direction and the Y direction both intersect with the Z direction. In the upper diagram of FIG. 1, the transverse direction of the page is called the X direction, and the left side (right side) of the page is called the left (right). The longitudinal direction of the page is called the Y direction, and the upper side (lower side) of the page is called the far side (near side). In addition, in the lower diagram of FIG. 1, the longitudinal direction on the page is called the Z direction (vertical direction), and the upper side (lower side) of the page is called up (down).

The indexing device 1 has a housing 3, and the housing 3 accommodates an input shaft 12, a barrel cam 14, an output table 20, a rotating shaft body 22, a plate member 30, and a pressing member 32. Further, a motor 10 is mounted to the housing 3 as a drive unit.

The motor 10 is provided so that its rotation shaft is aligned with the Y direction, and is connected to the input shaft 12 by a coupling 16.

The input shaft 12 is provided extending along the Y direction and is rotatably supported by an input bearing 18. A portion of the input shaft 12 on the near side extends further on the near side beyond the input bearing 18, and this extending portion is connected to the rotation shaft of the motor 10 by the coupling 16.

Further, the input shaft 12 is provided in both ends of the barrel cam 14 in the Y direction, and the barrel cam 14 and the input shaft 12 rotate integrally.

Further, the barrel cam 14 has a barrel cam groove 14a, and the spiral-shaped barrel cam groove 14a is provided along the direction of the input shaft 12. Then, by engaging a later-described cam followers 20a of the output table 20 with the barrel cam groove 14a, the rotation of the barrel cam 14 is transmitted to the output table 20. Note that the input shaft 12 and the barrel cam 14 may be integrated by joining together separately processed components, or may be manufactured by forming a cam groove in an integrally-manufactured shaft-shaped component.

The output table 20 has a circular shape and is rotatably supported by a supporting portion 24. In addition, the supporting portion 24 in the present embodiment is a large-diameter four-point contact ball bearing. The output table 20 includes a plurality of cam followers 20a that engage with the barrel cam 14 (the barrel cam groove 14a), and rotates around the rotation shaft extending along the Z direction due to rotation of the barrel cam 14 around the input shaft 12 extending along the Y direction.

The cam followers 20a are portions that engage with the barrel cam groove 14a, and are cylindrical rotating bodies that can rotate. The cam followers 20a are arranged such that the rotation axis direction conforms to the Z direction. A plurality of the cam followers 20a are provided at equal intervals along a circle centered on the rotation center of the output table 20. In the present embodiment, 16 cam followers 20a are provided at equal intervals (every 22.5 degrees).

Further, the cam followers 20a engage with the barrel cam groove 14a of the barrel cam 14 below the output table 20, and the engaged cam followers 20a are guided by the barrel cam groove 14a and move.

Specifically, when the barrel cam 14 rotates counterclockwise in a view from the near side, the engaged cam followers 20a are guided by the spiral barrel cam groove 14a to move from the near side to the far side along the circumferential direction of the output table 20. That is, the output table 20 rotates clockwise in a view from above.

In order to make the rotation of the output table 20 highly accurate, that is to say, in order to realize highly-accurate output, the cam followers 20a and the barrel cam groove 14a are engaged with high accuracy such that backlash, displacement, rattling, and the like do not occur (an engagement method for realizing highly-accurate output of cam mechanism is a well-known technique, so a description thereof will be omitted here).

The rotating shaft body 22 extends along the Z direction and is mounted to the central portion (the hollow portion) of the output table 20. The rotating shaft body 22 rotates integrally with the output table 20.

Further, the rotating shaft body 22 may be one without a hollow portion in the center (solid shaft), but the rotating shaft body 22 according to the present embodiment is a so-called hollow shaft with the hollow portion in it. That is, at the center of the rotating shaft body 22, a circular space is provided that passes through the rotating shaft body 22 in the vertical direction.

Clamp Device

The indexing device 1 according to the present embodiment has a clamp device which clamps the output table 20 when the output table 20 is stopping. The clamp device is, for example, a device that fixes an NC table (output table 20) for machine tools so that the NC table does not move during processing after indexing. The clamp device is provided for the purpose of improving the machining accuracy, for example.

In other words, the indexing device 1 includes: the barrel cam 14; the output table 20 that includes a plurality of the cam followers 20*a* that engage with the barrel cam 14, and that rotates by rotation of the barrel cam 14; and the clamp device that clamps the output table 20 when the output table 20 is stopping.

Figure 2A:
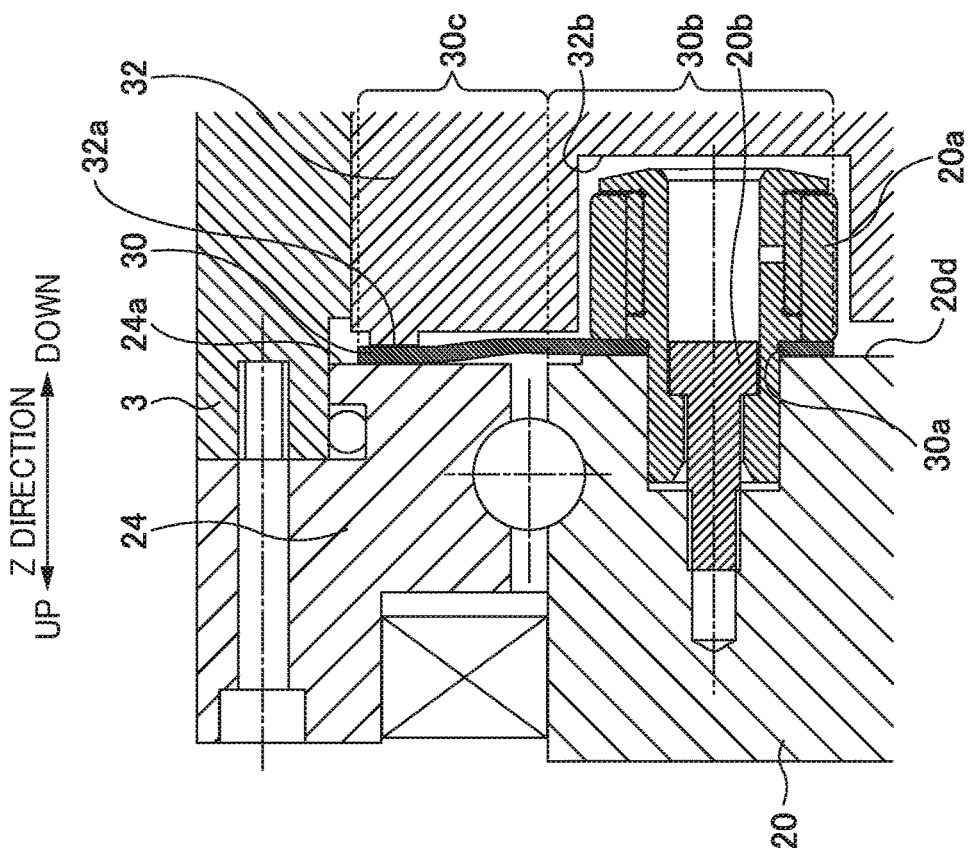
FIG. 2 is a diagram illustrating a clamp device.

The following describes the clamp device in detail with reference to diagrams. FIG. 2 is a diagram illustrating the clamp device. FIG. 2*a* is a diagram when the output table 20 is rotating and the output table 20 is not clamped, and FIG. 2*b* is a diagram when the output table 20 is stopped and the output table 20 is clamped.

Figure 2B:
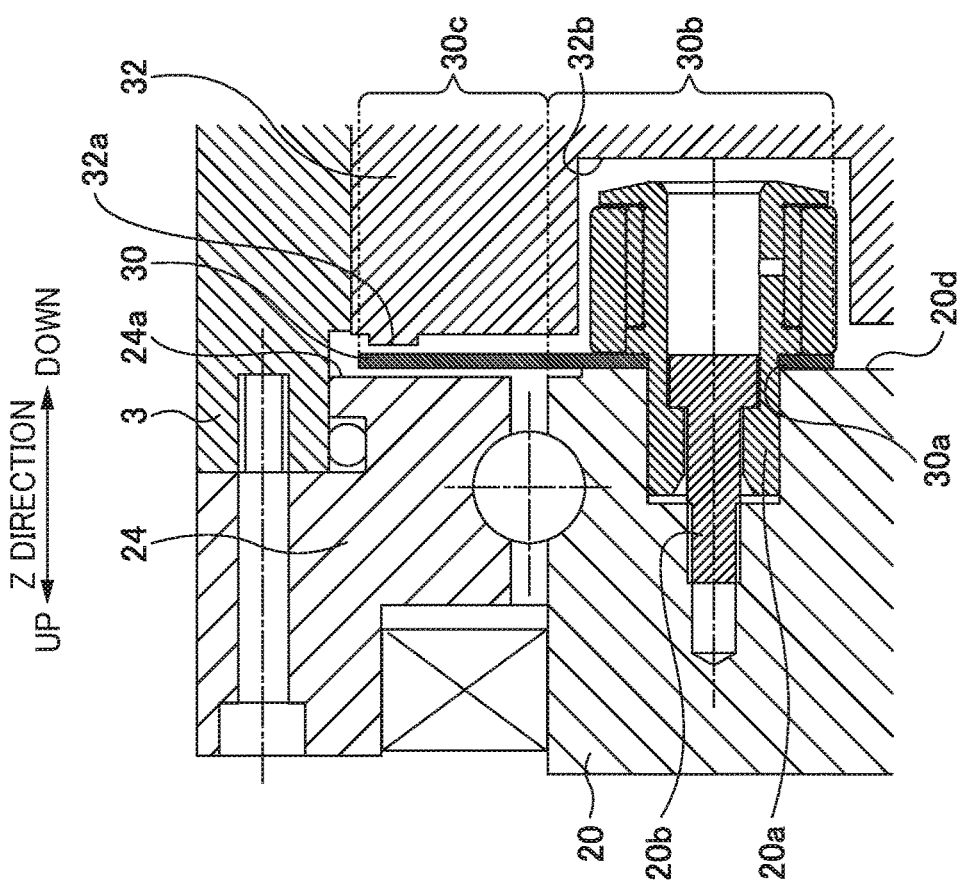

As shown in FIGS. 1 and 2, the clamp device includes: the plate member 30; the pressing member 32; and a piston back member 34. The plate member 30 and the pressing member 32 are provided within the housing 3. Then, as shown in FIG. 2B, when the output table 20 is stopping, the pressing member 32 presses the plate member 30 onto the supporting portion 24, thereby clamping the output table 20.

The plate member 30 is a disc-shaped metal plate made of stainless steel, phosphor bronze, etc., and has high rigidity in the circumferential direction, but has low rigidity in the thickness direction. In other words, if the plate member 30 is subject to a force applied in the circumferential direction, it is less likely to deform, but if the plate member 30 is subject to a force in the thickness direction (force to deform in the thickness direction), it deform easily. Further, since the plate member 30 is fixed to the output table 20, it rotates as the output table 20 rotates.

The plate member 30 includes: a fixed portion 30*b* that is fixed to the output table 20; and a opposing portion 30*c* that faces the supporting portion 24 with being in the non-contact state, when the output table 20 is rotating. As shown in FIG. 2A, when the output table 20 is rotating, the opposing portion 30*c* is held so as not to come into contact with any of the pressing member 32, the housing 3, and the supporting portion 24 (in other words, it does not interfere with the rotation of the output table 20).

Further, the fixed portion 30*b* is fixed to the table lower surface 20*d* of the output table 20. The opposing portion 30*c* faces the supporting-portion lower surface 24*a* of the supporting portion 24 with being in the non-contact state, when the output table 20 is rotating. The pressing member presses the opposing portion 30*c* against the supporting-portion lower surface 24*a* when the output table 20 is stopping.

Further, the fixed portion 30*b* of the plate member 30 has through holes 30*a*, through which the cam followers 20*a* pass. The plate member 30 and each of the cam followers 20*a* are fixed to the table lower surface 20*d* of the output table 20 by one bolt 20*b*. That is, the fixed portion 30*b* has the through holes 30*a*, and the fixed portion 30*b* and each of the cam followers 20*a* are fixed to the table lower surface 20*d* by the common bolt 20*b* in a state where the cam followers 20*a* pass through the through holes 30*a*.

Figure 3:
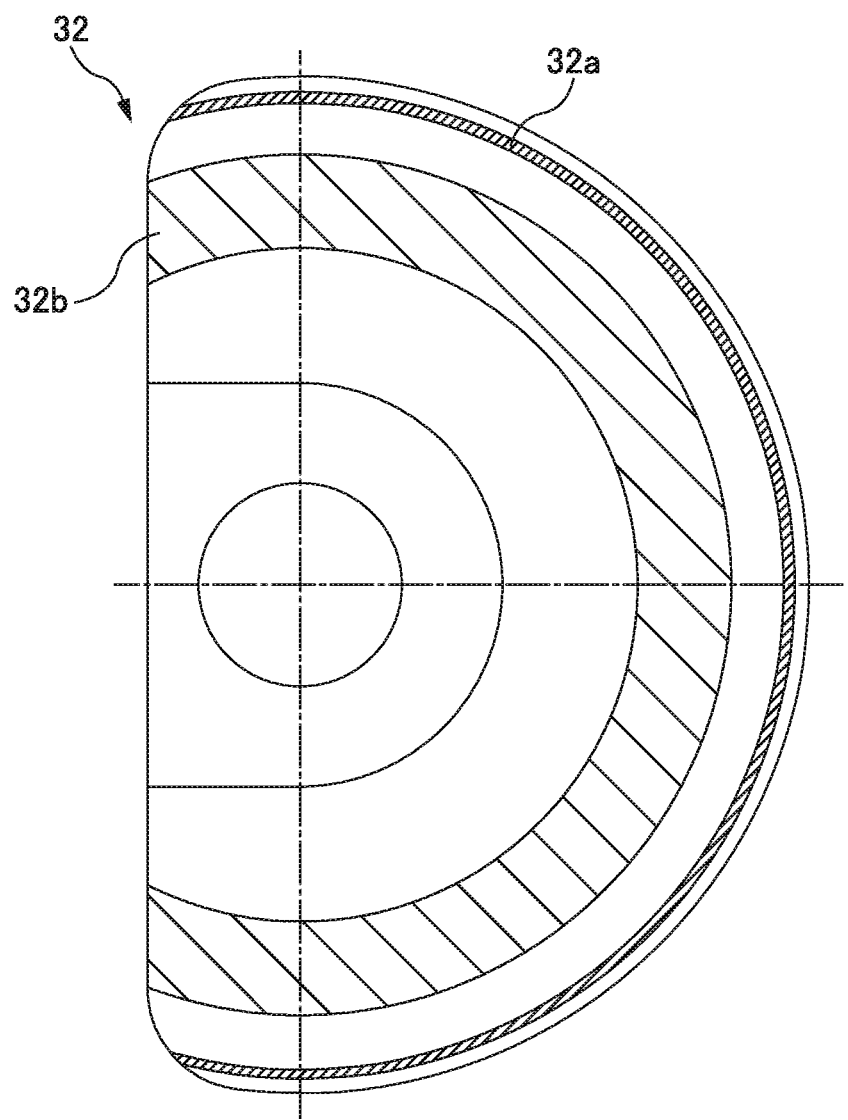
FIG. 3 is a schematic plan view of a pressing member 32.

FIG. 3 is a schematic plan view of the pressing member 32. The pressing member 32 is substantially D-shaped in plan view (when viewed from above in the Z direction), and has a projection 32*a* (a portion hatched obliquely upward to the right in FIG. 3) and the groove 32*b* (a portion hatched obliquely downward to the right in FIG. 3) on the surface.

The projection 32*a* is provided, as shown in FIG. 2, outside the outer circumferential edge of the output table 20 when being installed, and extends, as shown in FIG. 3, along the outer periphery of the pressing member 32. The projection 32*a* is provided so that the contact area is as small as possible in order to increase the contact surface pressure with the plate member 30. Further, the groove 32*b* is provided, as shown in FIGS. 1 and 3, extending along the arrangement of the cam follower 20*a*.

In addition, the pressing member 32 is moved upward (to the plate member 30 side) by the compressed air introduced from the compressed-air introducing hole 36 (see FIG. 1), which is provided in the housing 3 and below the pressing member 32, and this makes the projection 32*a* come into contact with and be pressed against the plate member 30. As a result, as shown in FIG. 2B, the projection 32*a* of the pressing member 32 deforms the plate member 30, and presses against the supporting portion 24 a portion of the plate member 30 that is located on the side opposite to the side where the projection 32*a* is in contact, making the output table 20 be clamped. Further, as will be described in detail later, when the introduced compressed air is removed, the pressing member 32 is moved downward by the piston back member 34, and becomes the unclamped state from the clamped state as shown in FIG. 2A. In other words, the pressing member 32 makes a piston movement up and down within the housing 3.

In other words, the pressing member 32 (the projection 32*a*) is a piston member that deforms the opposing portion 30*c* and presses it against the supporting portion 24 by moving and being in contact with the opposing portion 30*c* when the output table 20 is stopping.

Further, as shown in FIG. 1, the piston member (pressing member 32) is provided throughout the rotating shaft body 22 from the left side to the right side in the X direction. In other words, the piston member (pressing member 32) is provided throughout from the side where the barrel cam 14 is located when viewed from the rotating shaft body 22 to the side where the barrel cam 14 is not located when viewed from the rotating shaft body 22.

In addition, as shown in FIGS. 1 to 3, the piston member (pressing member 32) has the groove 32*b* that is for accommodating the cam followers 20*a* that are fixed to the output table 20, with being in the non-contact state, so as not to interfere with the rotation of the output table 20.

Also, as mentioned above, the piston member is moved upward by the compressed air introduced from the compressed-air introducing hole 36, but this is achieved by making a part of the housing 3 serve as a cylinder member through which the piston member moves. The introduced the compressed air is received by the entire surface of the piston member (the entirety of an approximately D-shaped surface shown in FIG. 3), and therefore this area is more than half of the area 20*c* of the table surface of the output table 20 (the hatched portion in FIG. 1).

In other words, a part of the housing 3 serves as the cylinder member for accommodating the piston member (pressing member 32), and the housing 3 is provided with the compressed-air introducing hole 36 that introduces the compressed air into the cylinder member, and the area of the pressed surface of the piston member (pressing member 32) that is pressed by the compressed air is more than half of the area 20*c* of the table surface of the output table 20.

The piston back member 34 is a member that releases the contact between the opposing portion 30*c* and the supporting portion 24 and the projection 32*a* (create a gap) by moving the piston member (pressing member 32) downward. In the piston back member 34, its upper end portion is fixed to the piston member (pressing member 32) within the housing 3, and its lower end portion receives a force from above to below by a spring 34*a*, outside the housing 3.

In other words, when the pressure of the compressed air that has been introduced at the time of clamping decreases (when the compressed air is excluded from the cylinder member), it decreases the force of the compressed air that pushes the piston member (pressing member 32) upward. As a result, the spring force of the spring 34a causes the piston member (pressing member 32) to move downward, making the output table 20 be in the unclamped state from the clamped state.

Effectiveness of the Indexing Device

As mentioned above, the indexing device 1 according to the present embodiment includes: the barrel cam 14; and the output table 20 which includes the plurality of cam followers 20a that engage with the barrel cam 14, and which rotates by rotation of the barrel cam 14; and the clamp device which clamps the output table 20 when the output table 20 is stopping. This makes it possible to realize the indexing device 1 that includes a compact and inexpensive clamp device.

In the case of providing at a low cost a clamp device which clamp an output table to an indexing device, there has been a problem that the indexing device have to be made large so that the clamp device can fit in. Alternatively, in the case of configuring the clamp device with small parts so that the clamp device can fit in, there has been a problem of increasing cost.

In contrast, in the case where the barrel cam device is employed as the indexing device 1, it increases locations where the clamp device can be installed compared to, for example, the case where a roller gear cam is used. In other words, by employing the barrel cam device as the indexing device 1, it increases the number of locations where the clamp device can be installed, making it possible to realize the indexing device 1 with a compact and inexpensive clamp device.

By providing the clamp device with the indexing device 1, it increases the rigidity of the output table 20 in the direction of rotation, for example. This makes it possible to improve the machining accuracy of workpieces. Further, for example, when an overload occurs on the output table 20, the clamp device can ensure safety. Also, for example, if the clamp device is provided, workers can work with peace of mind.

In the above embodiment, the indexing device 1 further includes the supporting portion 24 which rotatably supports the output table 20, and the clamp device includes: the plate member 30 which includes the fixed portion 30b fixed to the output table 20, and the opposing portion 30c facing the supporting portion 24 with being in the non-contact state when the output table 20 is rotating; and the pressing member 32 which presses the plate member 30 against the supporting portion 24 when the output table 20 is stopping. As a result, the clamp device has a simple structure consisting of the plate member 30 and the pressing member 32, making it possible to realize an inexpensive clamp device.

Further, in the above embodiment, the indexing device 1 further includes the housing 3 which accommodates the output table 20, and the plate member 30 and the pressing member 32 are provided within the housing 3. This makes it possible to effectively utilize a relatively large space in the housing 3 of the indexing device 1 (barrel cam device).

In the above embodiment, the fixed portion 30b is fixed to the table lower surface 20d of the output table 20, and when the output table 20 is rotating, the opposing portion 30c faces the supporting-portion lower surface 24a of the supporting portion 24 with being in the non-contact state, and the pressing member 32 presses the opposing portion 30c against the supporting-portion lower surface 24a when the output table 20 is stopping.

The supporting-portion lower surface 24a and the table lower surface 20d are both structurally arranged on substantially the same plane. Therefore, if the design is such that there is a slight difference between both surfaces instead of making both surfaces completely on the same plane, the following state can easily create by using that difference: in no-clamping state, the fixed portion 30b of the plate member 30 is fixed to the table lower surface 20d and the opposing portion 30c of the plate member 30 faces the supporting-portion lower surface 24a with a slight gap. In other words, by using the supporting-portion lower surface 24a and the table lower surface 20d, it is possible to easily realize to clamp the output table 20.

Further, in the above embodiment, the fixed portion 30b has the through holes 30a, and the fixed portion 30b and each of the cam followers 20a are fixed to the table lower surface 20d by the common bolt 20b in the state where the cam followers 20a pass through the through holes 30a.

By fixing the plate member 30 and each of the cam followers 20a by the common bolt 20b, it makes bolts for fixing the plate member 30 unnecessary. This makes it possible to reduce costs by reducing the number of parts.

Further, in the above embodiment, the pressing member 32 is the piston member that deforms the opposing portion 30c and presses it against the supporting portion 24 by moving and being in contact with the opposing portion 30c when the output table 20 is stopping.

As a result, the output table 20 is clamped not only by the frictional force that occurs between the plate member 30 and the supporting portion 24, but also by the frictional force that occurs between the plate member 30 and the piston member (pressing member 32), and this increases the clamping force.

Further, in the above embodiment, the indexing device 1 further includes the rotating shaft body 22 which is mounted to the central portion of the output table 20 and which rotates integrally with the output table 20, and the piston member (pressing member 32) is provided throughout from the side where the barrel cam 14 is located when viewed from the rotating shaft body 22 to the side where the barrel cam 14 is not located when viewed from the rotating shaft body 22.

As a result, the area of the piston member (pressing member 32) can be increased compared to the case where the piston member (pressing member 32) is not provided throughout from the side where the barrel cam 14 is located to the side where the barrel cam 14 is not located. Accordingly, the pressure of the compressed gas, etc. becomes greater and presses the plate member 30, making it possible to clamp the output table 20 with a greater force.

Furthermore, in the above embodiment, the piston member (pressing member 32) has the groove 32b that accommodates the cam followers 20a with being in the non-contact state. This makes it possible to prevent the piston member (pressing member 32) from interfering with the rotation of the output table 20.

Further, in the above embodiment, the indexing device 1 further includes the housing 3 which accommodates the output table 20, and a part of the housing 3 serves as the cylinder member that accommodates the piston member (pressing member 32), and the housing 3 is provided with the compressed-air introducing hole 36 which introduces the compressed air into the cylinder member, and the area of the pressed surface of the piston member (pressing member 32), which is pressed by the compressed air, is more than half the area of the table surface of the output table 20.

By increasing the area of the piston member (pressing member 32) to more than half of the area of the output table 20, compared to the case where the area of the piston member is less than half of the area of the output table 20, the pressure of the compressed air becomes greater and presses the plate member. This makes it possible to clamp the output table with a great force.

Other Embodiments

The above embodiment is simply to facilitate understanding of the present disclosure and is not in any way to be construed as limiting the present disclosure. The present disclosure may variously be changed or altered without departing from its gist and encompass equivalents thereof.

Further, in the above embodiment, a four-point contact ball bearing is used for the supporting portion 24, but the present disclosure is not limited to this. For example, a cross roller bearing may be used.

Further, in the above embodiment, the pressing member 32 is moved upward by the compressed air, but the present disclosure is not limited to this. For example, the pressing member 32 may be moved upward using hydraulic pressure.

REFERENCE SIGNS LIST 1. indexing device (barrel cam device), 3 housing, 10 motor,
12 input shaft, 14 barrel cam, 14a barrel cam groove, 16 coupling,
18 input bearing, 20 output table, 20a cam follower, 20b bolt,
22 rotating shaft body, 24, supporting portion,
30 plate member, 30a through hole, 30b fixed portion,
30c opposing portion, 32 pressing member (piston member),
32a projection, 32b groove,
34 piston back member, 34a spring,
36 compressed-air introducing hole

The invention claimed is:

1. A barrel cam device comprising:
a barrel cam;
an output table
that includes a plurality of cam followers that engage with the barrel cam, and
that rotates by rotation of the barrel cam; and
a clamp device that clamps the output table when the output table is stopping;
wherein the barrel cam device further comprises a supporting portion that rotatably supports the output table;
wherein the clamp device includes,
a plate member that includes
a fixed portion that is fixed to the output table, and
an opposing portion that faces the supporting portion with being in a non-contact state, when the output table is rotating, and
a pressing member that presses the plate member against the supporting portion when the output table is stopping, the pressing member being a piston member that deforms the opposing portion and presses the opposing portion against the supporting portion by moving and being in contact with the opposing portion when the output table is stopping;
wherein the barrel cam device further comprises a rotating shaft body,
that is mounted to a central portion of the output table and
that rotates integrally with the output table; and
wherein the piston member is provided throughout from a side where the barrel cam is located when viewed from the rotating shaft body to a side where the barrel cam is not located when viewed from the rotating shaft body.

2. The barrel cam device according to claim 1, wherein the barrel cam device further comprises a housing that accommodates the output table, and
the plate member and the pressing member are provided within the housing.

3. The barrel cam device according to claim 1, wherein the fixed portion is fixed to a table lower surface of the output table,
when the output table is rotating, the opposing portion faces a supporting-portion lower surface of the supporting portion while being in the non-contact state, and
the pressing member presses the opposing portion against the supporting-portion lower surface when the output table is stopping.

4. The barrel cam device according to claim 3, wherein the fixed portion has a through hole, and
the fixed portion and the cam follower are fixed to the table lower surface by a common bolt in a state where the cam follower passes through the through hole.

5. A barrel cam device comprising:
a barrel cam;
an output table
that includes a plurality of cam followers that engage with the barrel cam, and
that rotates by rotation of the barrel cam; and
a clamp device that clamps the output table when the output table is stopping;
wherein the barrel cam device further comprises a supporting portion that rotatably supports the output table;
wherein the clamp device includes,
a plate member that includes
a fixed portion that is fixed to the output table, and
an opposing portion that faces the supporting portion with being in a non-contact state, when the output table is rotating, and
a pressing member that presses the plate member against the supporting portion when the output table is stopping, the pressing member being a piston member that deforms the opposing portion and presses the opposing portion against the supporting portion by moving and being in contact with the opposing portion when the output table is stopping; and
wherein the piston member has a groove that accommodates the cam follower with being in the non-contact state.

6. The barrel cam device according to claim 5, wherein the barrel cam device further comprises a rotating shaft body
that is mounted to a central portion of the output table and
that rotates integrally with the output table, and
the piston member is provided throughout from a side where the barrel cam is located when viewed from the rotating shaft body to a side where the barrel cam is not located when viewed from the rotating shaft body.

7. A barrel cam device comprising:
a barrel cam;
an output table
that includes a plurality of cam followers that engage with the barrel cam, and
that rotates by rotation of the barrel cam; and a clamp device that clamps the output table when the output table is stopping;

wherein the barrel cam device further comprises a supporting portion that rotatably supports the output table;

wherein the clamp device includes,
- a plate member that includes
  - a fixed portion that is fixed to the output table, and
  - an opposing portion that faces the supporting portion with being in a non-contact state, when the output table is rotating, and
- a pressing member that presses the plate member against the supporting portion when the output table is stopping, the pressing member being a piston member that deforms the opposing portion and presses the opposing portion against the supporting portion by moving and being in contact with the opposing portion when the output table is stopping; and wherein the barrel cam device further comprises,
- a housing that accommodates the output table,
- a part of the housing serves as a cylinder member that accommodates the piston member,
- the housing is provided with a compressed-air introducing hole that introduces a compressed air into the cylinder member, and
- an area of a pressed surface of the piston member that is pressed by the compressed air is more than half of an area of a table surface of the output table.

* * * * *